US006472863B1

(12) United States Patent
Garcia

(10) Patent No.: US 6,472,863 B1
(45) Date of Patent: Oct. 29, 2002

(54) MAGNETIC PERMEABILITY POSITION DETECTOR

(75) Inventor: Fernando Garcia, Santana do Parnaiba - SP (BR)

(73) Assignee: Elevadores Atlas-Schindler S.A., Sao Paulo (BR)

( * ) Notice: Subject to any disclaimer, the term of this patent is extended or adjusted under 35 U.S.C. 154(b) by 0 days.

(21) Appl. No.: 09/676,842

(22) Filed: Sep. 29, 2000

(30) Foreign Application Priority Data

Sep. 30, 1999 (BR) .............................. 9905263

(51) Int. Cl.$^7$ .............................. G01P 3/48; G01P 3/60
(52) U.S. Cl. .................. 324/173; 324/166; 324/207.17; 324/207.25
(58) Field of Search .................. 324/165, 166, 324/173, 174, 207.11, 207.12, 207.13, 207.15, 207.16, 207.17, 207.23, 207.24, 207.25; G01D 5/16

(56) References Cited

U.S. PATENT DOCUMENTS

| | | | | |
|---|---|---|---|---|
| 3,728,565 A | * | 4/1973 | O'Callaghan | 310/168 |
| 3,855,525 A | * | 12/1974 | Bernin | 324/207.19 |
| 4,370,614 A | * | 1/1983 | Kawada et al. | 324/173 |
| 4,947,116 A | * | 8/1990 | Welcome et al. | 324/173 |
| 5,057,727 A | * | 10/1991 | Jones | 310/68 B |
| 5,510,708 A | * | 4/1996 | Shirai et al. | 324/174 |
| 5,977,765 A | * | 11/1999 | Gibson et al. | 324/165 |

FOREIGN PATENT DOCUMENTS

GB 0357200 A2 * 3/1990 ............ G01D/5/16

* cited by examiner

Primary Examiner—Edward Lefkowitz
Assistant Examiner—Darrell Kinder
(74) Attorney, Agent, or Firm—D. Peter Hochberg; Katherine R. Vieyra; Sean Mellino

(57) ABSTRACT

A position, speed and displacement speed detector for a continuous reference element (2) is described that is constituted by a pair of polar search elements (1A, 1B), comprised of magnetic sheets having longitudinal teeth (10A, 10B) distributed along its face turned to the continuous reference element (2). The polar search elements further comprise a winding (3A, 3B) which, when fed with a pre-established current, generates a magnetic field. The voltage generated in that coil is a function of the permeability measured by the polar search element (1A, 1B) and, accordingly, is a function of the relative position between the teeth of the pair of polar search elements. By reading the coil voltages and through the device for identification of the direction and relative displacement speed of the teeth of the pair of polar search elements and reference element, the position, direction and displacement speed are identified. Another characteristic of this invention is the utilization of a detection system that employs a comparison of two sine wave signals displaced by 90 degrees.

7 Claims, 3 Drawing Sheets

MAGNETIC PERMEABILITY POSITION DETECTOR

Figure 1:
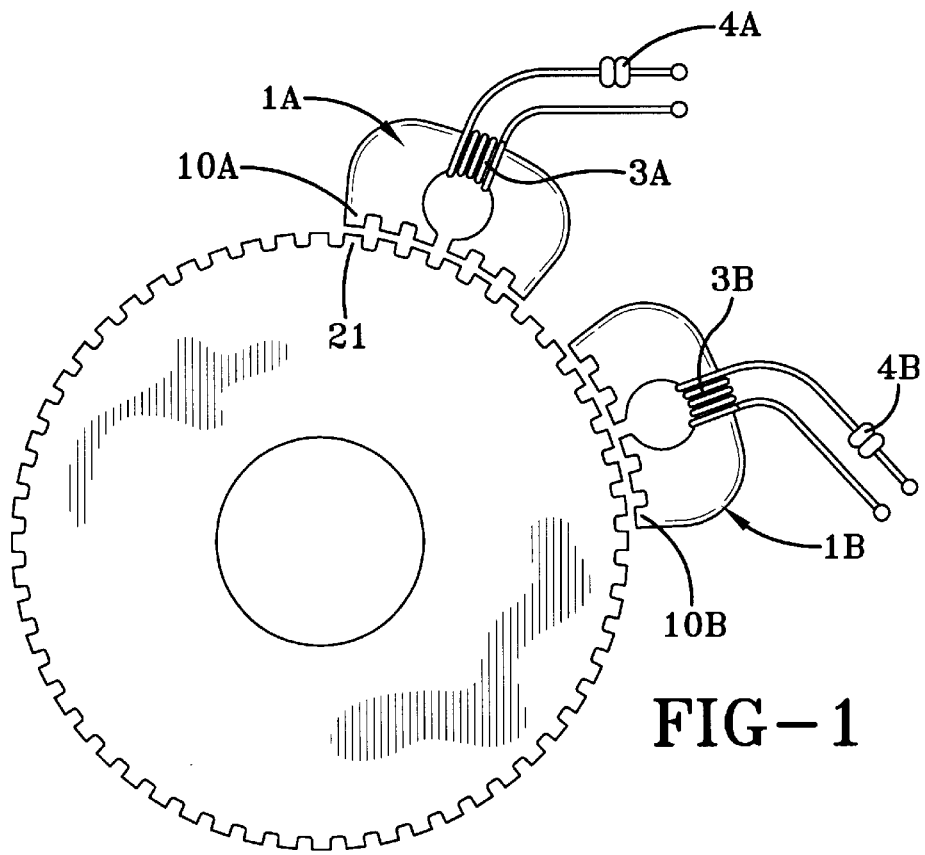

The present invention relates to a new position, speed and direction detector. More specifically, the present invention relates to a device for monitoring and identification of the absolute position, speed and direction between two elements that are in relative rotating or linear movement.

The device features as main characteristic thereof a low-cost device that allows the accurate identification of the above mentioned parameters.

As is known to those skilled in the art, the conventional systems employ optical or electromagnetic absolute position detectors to measure and control parameters, such as resolvers or encoders.

However, all of those devices have the drawback of high device cost, associated to the need of complex and expensive electronic circuits for interpretation of the signals provided by those devices.

Another drawback of those conventional systems is that they do not possess the necessary sturdiness for heavy duty service.

Accordingly, it is an object of the present invention to provide a low-cost position, speed and direction detector that does not require complex and expensive control circuits.

It is another object of the present invention to provide a low-cost position, speed and direction detector having a simple and sturdy construction.

It is yet another object of the present invention to provide a particular device that can be easily incorporated into electrical machines, so as to ensure accuracy, sturdiness and easy maintenance, the application thereof in electrical machines being particularly simplified in some cases, due to the fact of employing the machine's geometrical configuration, more specifically the arrangement of the rotor teeth or poles.

These and other objects and advantages of the present invention are achieved with a device that detects the position, speed and direction between two elements in relative movement to each other, by monitoring and controlling the magnetic permeability measured by the device.

This device is comprised of at least a pair of polar search elements attached to one of the parts, and a continuous reference element attached to the other part.

The pair of polar search elements is constituted by cores comprised of ferromagnetic sheets having at least two longitudinal teeth arranged on its face turned to the continuous reference elements and surrounded by drive coils.

The polar elements are constructed in such a manner that the width of and spacing between its teeth are exactly equal to the width of and spacing between the teeth of the continuous reference element.

The polar elements are totally electrically and magnetically uncoupled but are mechanically coupled to each other, in such a manner that, when the centerlines of the teeth of a polar element are fully aligned with the centerline of the teeth of the continuous reference element, the other polar element will have the centerline of its teeth displaced by exactly half a tooth width from the centerline of the continuous reference element tooth.

Each polar search element is surrounded by a winding comprised of at least one drive coil.

The drive coil is individually fed by a pre-established, high frequency current source that generates a magnetic field. The voltage generated in this coil is a function of the permeability measured by the polar search element.

In the event that more than one coil is employed, the coil not fed by the current source is employed as reading coil, the generated voltage of which is a function of the permeability measured by the polar search element.

The above mentioned continuous reference element is an integral part of the machine and is in turn provided with a core comprised of ferromagnetic sheets with longitudinal teeth uniformly distributed along its face turned to the pair of polar elements.

The distance between the teeth of the continuous reference element should be about 2–2.5 times the teeth width.

After the reference element is attached to one of the moving parts, the pair of polar elements is attached to the other part, preferably the static part, so that when one of the polar elements has the centerlines of its teeth fully aligned with the centerline of the continuous reference element teeth, the other polar element should have the centerline of its teeth displaced by exactly half a tooth width in relation to the centerline of the continuous reference element teeth.

Figure 2:
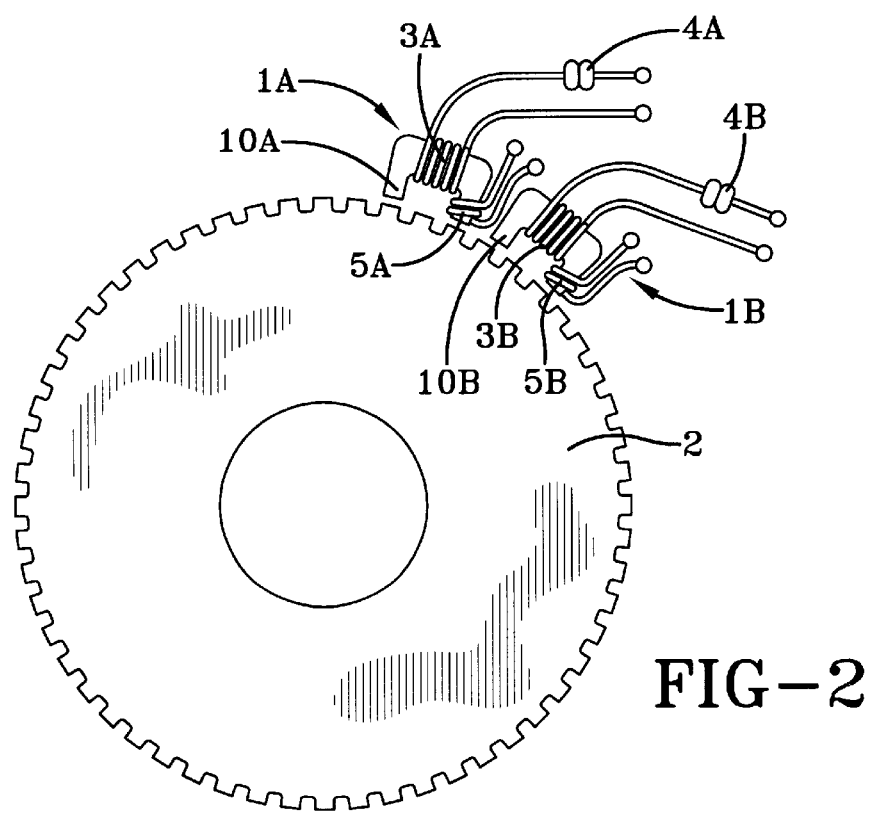
Figure 3:
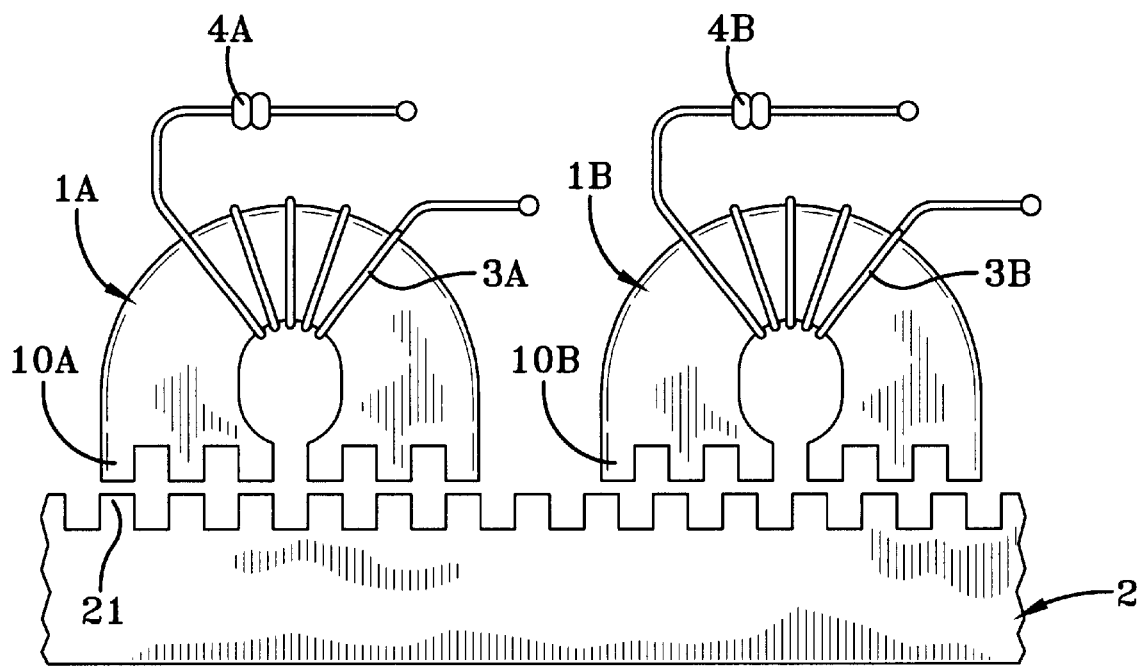
Figure 4:
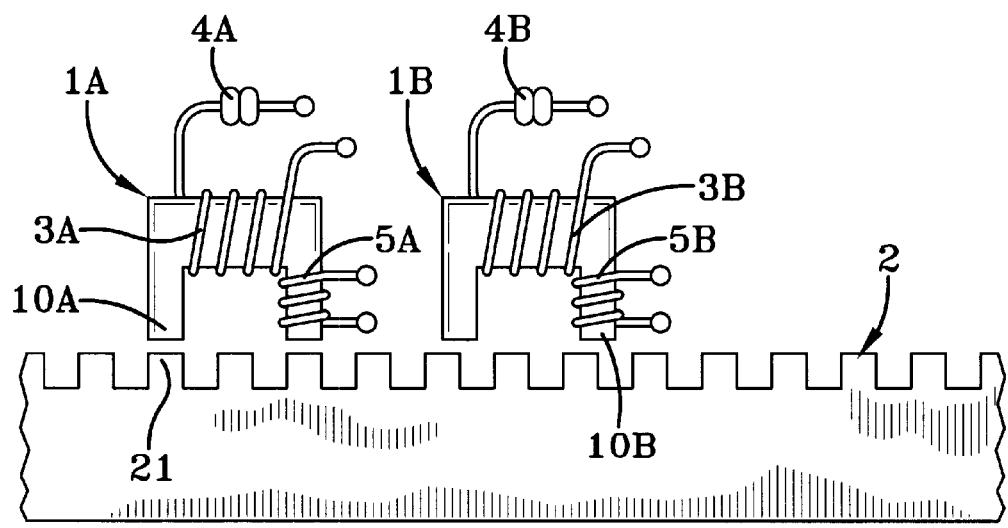
Figure 5:
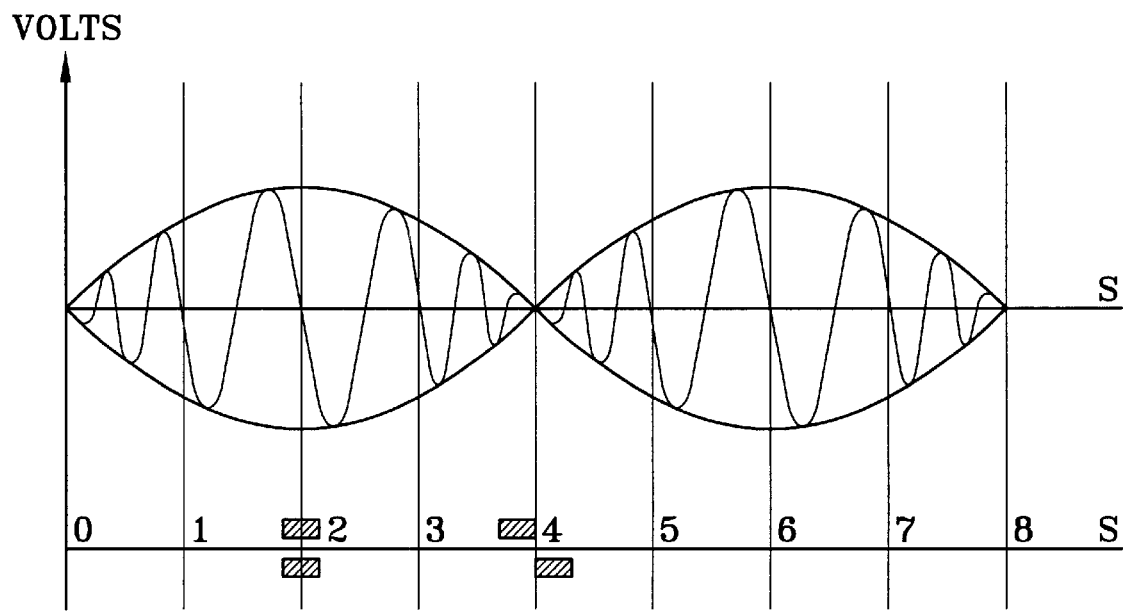
Figure 6:
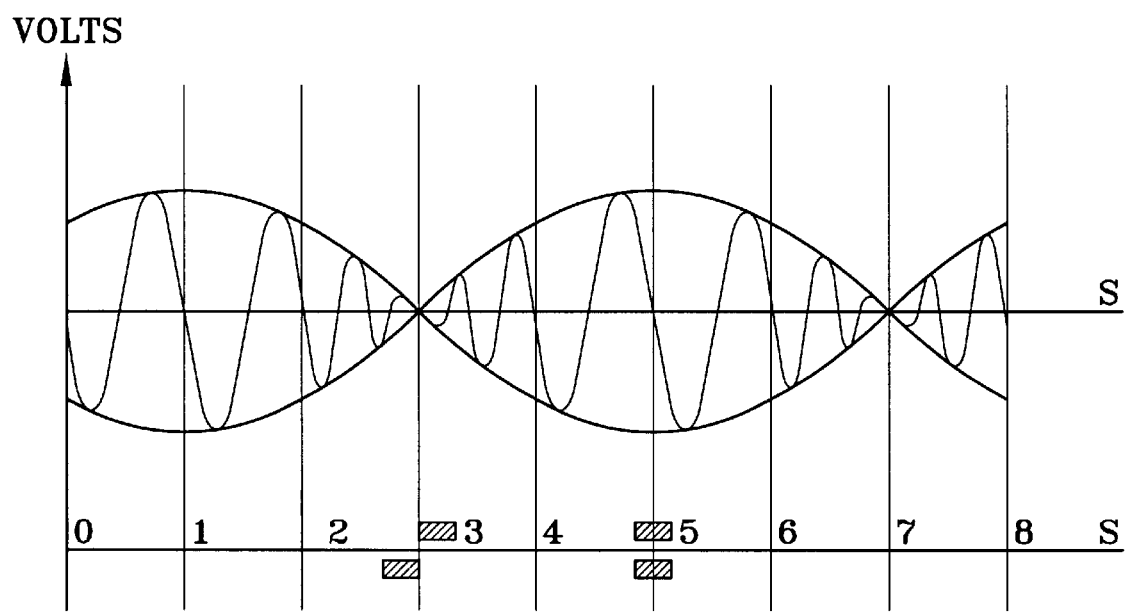

The object of the present invention will be best understood in the light of the following description made with reference to the appended figures, shown by way of illustration and not as limitation of the scope of the invention, wherein:

FIG. 1 schematically shows a cross-section of the device comprising the pair of polar search elements (1A and 1B) with the drive coils (3A and 3B) and the coil feed current sources (4A and 4B) and the reference element (2) constituted according to the concept of the invention as defined for the position detection device;

FIG. 2 schematically represents another manner of construction of the polar search element (1A and 1B) with the drive coils (3A and 3B) and reading coils (5A and 5B);

FIGS. 3 and 4 schematically represent FIGS. 1 and 2 with the linearized elements; and FIGS. 5 and 6 represent a graph of the voltage waveform on the drive coil terminals of the polar element (1A) and (1B), respectively.

In accordance with FIGS. 1 and 2, the reluctance detector subject matter of the present invention is formed of a pair of polar search elements (1A, 1B), each provided with a core comprised of ferromagnetic sheets having respective longitudinal teeth (10A, 10B) arranged on its face turned to the reference element (2) and provided with grooves to house the windings (3A and 3B).

These windings (3A, 3B) are comprised of a plurality of coils surrounding the magnetic material of the pair of polar search elements (1A, 1B) so as to generate a magnetic field perpendicular to the outer surface of the teeth of the pair of polar search elements, whenever this winding is energized.

An integral part of the reluctance detector is said reference element (2) which is in its turn provided with a core of ferromagnetic sheets having longitudinal teeth (21) uniformly distributed along its face turned to the pair of polar search elements (1A, 1B), said teeth (21) having a width and spacing equal to the width and spacing of the pair of polar search elements teeth. Said reference element (2) is arranged near the moving part the rotation, speed and direction of which are to be detected.

For a better understanding of the invention, the operation of the reluctance detector will be described in a more detailed manner, taking as reference a pair of polar search elements and a linearized reference element, as illustrated on FIGS. 3 and 4.

In the basic operation form as presently described, the reference element (2) is attached to the moving part, the angular or linear speed and direction of rotation of which are to be detected and determined. The polar search elements are in turn attached to the fixed movement reference structure.

In particular, for example, in respect of utilization of this detector to determine the speed of rotation and direction of a motor, the reference element (2) is attached to the rotor thereof, whereas the search elements are attached to the motor shell, in a coplanar manner.

On FIG. 3, one can observe the teeth (10A) of one of the pairs of polar search elements (1A) aligned with teeth (21) of the reference element (2).

Still on FIG. 3, one can see that the centerline of teeth 10B of the other pair of polar search elements (1B) is displaced by half a tooth in relation to the centerline of teeth (21) of the reference element (2).

In this position, coils 3a and 3b are energized, that is, a magnetic field is created the field lines of which penetrate the continuous reference element and converge to (close into) the polar element.

The voltage generated in coil 3A is maximum, as can be observed on FIG. 5 (on abcissa 2) and the voltage generated in coil 3B has an intermediate value between the maximum and minimum values, as can be observed on FIG. 6 (on abcissa 2).

Upon displacement of the reference element teeth, the values of the voltage generated on the two coils 3A and 3B will undergo a change proportional to the permeability detected by the teeth of the polar search elements.

The values obtained are cyclical and repeated at every spacing of a reference element tooth.

As can be seen on FIGS. 5 and 6, to each pair of values of voltage generated in coils 3A and 3B will correspond only one relative position between the teeth of the polar search element and the teeth of the continuous reference element.

Through the differential of 2 consecutive readings obtained in a track below one spacing of the tooth of the continuous reference element, one can obtain in a known manner the direction of displacement of the above mentioned element.

By obtaining this differential and determining the time interval between these two readings one can also obtain through a known mathematical operation the linear or angular speed of the continuous reference element and, accordingly, of the movable element to which it is attached, such as the rotor of an electric motor or the crankshaft of an internal combustion engine.

Even though some of the constructing models for the sub-synchronous reluctance detector have been described and illustrated, it should be pointed out that the inventive concept can be applied to any kind of configuration or avail itself of any kind of feed for the search winding 3A and 3B or reading element 5A and 5B of the pair of search elements 1A and 1B.

What is claimed is:

1. A magnetic permeability position detector, comprising a continuous reference element and at least two polar search elements that are electrically excited, each of the polar search elements being provided with a core comprised of magnetic sheets and provided with longitudinal teeth projecting towards the continuous reference element, said polar search elements further comprising a plurality of grooves capable of receiving a winding, said winding being comprised of at least one search coil and at least one reading coil homogenously surrounding the magnetic material of the pair of polar search elements, and whereby said detector detects the relative speed, position and sense of rotational and/or linear movement between said polar search elements and said reference element.

2. The detector in accordance with claim 1, wherein said at least one search coil consists of only one search coil, and wherein each of the polar search elements possesses the winding comprised of only one search coil, said search coil being fed by an electric current source and the voltage generated thereon detects the change in the magnetic field.

3. The detector in accordance with claim 1, wherein each of the polar elements possesses the winding comprised of one search coil and one reading coil, said search coil being electrically excited and said reading coil able to detect the changes in the magnetic field.

4. Detector in accordance with claim 1, characterized in that the determination of the relative position between the polar search elements (1A, 1B) and the reference element (2) is done by reading the relative voltages in each of the windings (3A, 3B) and that the relative displacement speed between the polar search elements (1A, 1B) and the reference element (2) is obtained from two successive readings displaced in time.

5. Detector in accordance with claim 1, characterized in that the dimensions and spacing of teeth (10A, 10B) of the polar search elements (1A, 1B) are equal to the dimensions and spacing of teeth 21 of reference element (2).

6. The detector in accordance with claim 1, wherein the first polar search element is arranged in a displaced manner in relation to the second polar search element, and characterized in that the centerline of the teeth of the second polar search element is displaced by half a tooth in relation to the centerline of the teeth of the reference element.

7. Detector in accordance with claim 1, characterized in that the continuous reference element is circular or linear.

* * * * *